United States Patent Office 3,135,785
Patented June 2, 1964

3,135,785
DI(PENTAERYTHRITOL TRIMONOCARBOXYL-ATE) ALKYLENE DICARBOXYLATE
Fred A. Fritz, Newark, Del., assignor to Hercules Powder Company, Wilmington, Del., a corporation of Delaware
No Drawing. Filed Dec. 19, 1956, Ser. No. 629,213
7 Claims. (Cl. 260—485)

The present invention relates to novel plasticizers which have been found to be particularly effective as plasticizers for vinyl resin compositions, especially for polymers and copolymers of polyvinyl chloride.

The prior art generally discloses the use of compounds such as di(2-ethylhexyl)phthalate, various diesters of glycols, various diesters of adipic and sebacic acids, various esters of phosphoric acid, etc. as plasticizers for resins such as polymerized vinyl chloride or copolymers of vinyl chloride with other vinyl compounds such as vinyl acetate, etc. Plasticization of these resins is necessary since they are normally rigid, hard, and tough in the unplasticized state. By the use of plasticizers such resins can be made to possess durability and flexibility, which properties make them useful in the forms of films or sheets, supported or unsupported by a fabric backing, in the manufacture of handbags, upholstery, shower curtains, and many other useful articles. The plasticized resins also may be molded by various methods to yield stair treads, wire insulation, and other articles of commerce.

In the majority of uses for polymerized vinyl halide resins, it is desirable that the plasticizer have excellent compatibility with the resin, show little or no tendency to spew or migrate from the resin, be low in volatility, provide flexibility over a broad range of temperature, and resist extraction by oil and water.

The properties of plasticized polymerized vinyl halide compositions are related to the chemical nature of the plasticizer and, in practice, attempts to improve any given property in a plasticized composition necessarily involve compromise of some other property. Expressed in another way, a given plasticizer has a given effect on any specific property of the polymerized vinyl halide composition in which it is used and to change any one property by using a blend of plasticizers invariably involves a compromise of some other property of the plastic. The ideal plasticizer would be perfect in every respect but in practice there is no ideal plasticizer. Thus, some plasticizers contribute flexibility at extremely low temperatures but are excessively volatile and tend to migrate from the film; others are low in volatility but poor in color stability and in low temperature properties; and still others are extremely low in volatility and good in resistance to migration but are poor in low temperature properties and in plasticizing efficiency. From these facts, it is apparent that the choice of a plasticizer, or blend of plasticizers, in any given instance will be controlled primarily by the properties which are most necessary in the ultimate use.

There is prior art pertaining to the use of esters of pentaerythritol as plasticizers for vinyl halide polymers. Specifically, for example, the tetraesters of pentaerythritol with fatty acids have been proposed and even used on a comparatively large scale. Such esters have a good balance of properties but for some applications they are lacking in permanence, i.e., that quality which is generally assessed by measuring volatility, migration, and resistance to extraction by oil and soap.

It has more recently been found that various tetraesters of dipentaerythritol and certain saturated fatty acids have a range of utility not possessed by the corresponding tetraesters of pentaerythritol. It has been found, for example, that the tetraesters of dipentaerythritol and certain saturated fatty acids possess outstanding permanence characteristics coupled with adequate plasticizing efficiency over a fairly broad temperature range when used as plasticizers for synthetic resins, particularly vinyl chloride resins. A considerable market for such plasticizers has, in fact, been established but because of the relative scarcity of dipentaerythritol, the availability of such plasticizers has been limited. There still exists a need for plasticizers of comparable quality which can be made from more readily available raw materials than dipentaerythritol.

In accordance with the present invention, there are provided novel plasticizers that are prepared from pentaerythritol, a saturated aliphatic dicarboxylic acid, and a saturated fatty acid in certain definite proportions. More explicitly, the novel plasticizers of the invention, which possess outstanding permanence characteristics, coupled with other adequate properties, are prepared by esterifying pentaerythritol with an alkylene dicarboxylic acid having from 4 to 10 carbon atoms and a saturated fatty acid selected from the group consisting of saturated fatty acids having a chain length of from 3 to 10 carbon atoms and mixtures of saturated fatty acids having from 3 to 10 carbon atoms in proportions to provide an average chain length of from 4 to 7 carbon atoms in the proportion of 2 moles of pentaerythritol to 1 mole of said dicarboxylic acid to 6 moles of said fatty acid. Structurally speaking, the plasticizers comprise esters characterized by the general formula:

(I)
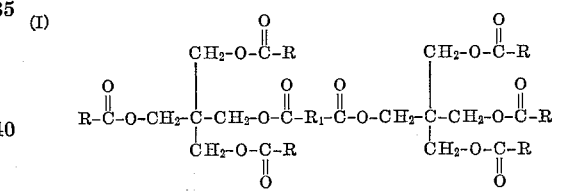

where $R_1$ is an alkylene radical of from 2 to 8 carbon atoms and each R represents an alkyl radical having from 2 to 9 carbon atoms with the average chain length of all R radicals being from 3 to 6 carbon atoms.

The plasticizers of the invention, in addition to exhibiting outstanding permanence characteristics and other excellent plasticizing properties, are also resistant to degradation by heat and light and also possess good electrical characteristics. Still further, the plasticizers are liquids of low viscosity which contributes to ease of handling and processing. The plasticizers can also be used to formulate excellent vinyl plastisols which are characterized by exceptional viscosity stability.

The following examples illustrate the preparation and the advantageous properties of the plasticizers but do not limit in any way the scope of the invention. All parts and percentages in the examples and elsewhere in the specification are by weight unless otherwise specified.

EXAMPLE 1

Into a reaction vessel equipped with an agitator, a thermometer, a water trap, and reflux condenser, there was placed 272 parts (2 moles) of technical pentaerythritol, 146 parts (1 mole) of adipic acid, and 824 parts (7.2 moles —20% excess) of a mixture of saturated normal fatty acids, said mixture having an average chain length of 6 carbon atoms and being of the following composition:

| | Molar percentage |
|---|---|
| N-butyric acid | 29 |
| Pentanoic acid | 12 |
| Hexanoic acid | 16 |
| Heptanoic acid | 20 |
| Octanoic acid | 25 |

This reaction mixture was heated with agitation at a temperature of about 235° C. for 3½ hours. The excess fatty acid was then removed by stripping at an ultimate temperature of about 235° C. and a pressure of about 3 mm. Hg. The temperature was next lowered to 160° C. and 50 parts of lime was added, agitation being conducted for about ⅓ hour. The resulting ester was cooled and filtered through diatomaceous earth. It was a liquid having the following characteristics:

| | |
|---|---|
| Acid number | 0.29 |
| Percent hydroxyl | 0.37 |
| Saponification number | 458 |
| Volume resistivity (ohm-cm.$^3$) | $3.8 \times 10^{11}$ |

EXAMPLE 2

The procedure of Example 1 was followed but with the substitution of 132 parts of glutaric acid for the adipic acid employed in the previous example. Esterification was carried out as before and the product subsequently was limed and filtered. The final ester was a mobile liquid having the following characteristics:

| | |
|---|---|
| Acid number | 0.23 |
| Percent hydroxyl | 0.33 |
| Saponification number | 457 |

EXAMPLE 3

The procedure of Example 1 was followed but with the substitution of 116 parts of succinic acid for the adipic acid employed in the previous example. Esterification was carried out as before and the product subsequently was limed and filtered. The final ester was a mobile liquid having the following characteristics:

| | |
|---|---|
| Acid number | 0.24 |
| Percent hydroxyl | 0.24 |
| Saponification number | 473 |
| Volume resistivity (ohm-cm.$^3$) | $1.1 \times 10^{12}$ |

EXAMPLE 4

Into a reaction vessel equipped with an agitator, a thermometer, a nitrogen sparge tube, a water trap, and reflux condenser, there was placed 272 parts of technical pentaerythritol, 146 parts of adipic acid, and 412 parts of a mixture of saturated normal fatty acids, which mixture had an average chain length of 6 carbon atoms and was of the same composition as in Example 1. The reaction mixture was heated with agitation under a sparge of nitrogen to a temperature of about 200° C. until the acid number was approximately 2. An additional 412 parts of fatty acids was then added and reaction was conducted at 200° C. for 4 hours. Excess fatty acids were stripped and the product was then limed and filtered as in Example 1. The characteristics of the product were essentially the same as the characteristics of the product of Example 1.

EXAMPLE 5

A master batch of a polymerized polyvinyl chloride composition was prepared by mixing 100 parts of polyvinyl chloride with 5 parts Plumb-O-SilB (a coprecipitated mixture of lead orthosilicate and silica gel having a lead content of 49–50% and an $SiO_2$ content of 50–51%) and 1 part of dibasic lead stearate. To aliquot portions of this composition there was added 50 parts of one of the esters of Examples 1 through 3 which was mixed thoroughly by hand stirring. The resulting composition was then milled for 10 minutes at 160° C. on an even speed two-roll mill. Tests were next carried out by standard methods of plasticizer evaluation widely employed in the industry.

Low temperature brittleness was determined in accordance with ASTM D746–52T. The values obtained represent the lower temperature limits beyond which the plastics are not sufficiently flexible to resist cracking under a sharp blow applied under controlled conditions. Volatility was determined according to ASTM D1203–52T and results are reported as losses in percentage by weight of plasticizer. Elongation and tensile strength values were determined by ASTM D412–52T using Die-C and a Scott DH–2 tensile tester operating at a jaw separation rate of 12 inches per minute. Oil extraction was determined by weight difference of the plastic after immersion for 24 hours at 50° C. in Fractol A. Soap extraction was determined by weight difference after immersion for 24 hours at 50° C. in a 1% solution of Ivory soap.

Shown in the following table are the physical properties of the various compositions. For comparative purposes there are included the physical properties of control compositions prepared using as the plasticizer, the pentaerythritol tetraester of the same mixture of fatty acids described in the foregoing examples.

*Comparative Plasticizing Properties*

| Plasticizer | Tensile Modulus at 100 Percent Elongation, p.s.i. | Maximum Elongation, Percent | Tensile Strength, p.s.i. | Hardness, Shore, A2 | Brittle Temp., ° C. | Volatility SPI, Percent Loss | Extraction Loss, Percent | |
|---|---|---|---|---|---|---|---|---|
| | | | | | | | Soap Soln. | Oil |
| Example 1 | 2,150 | 320 | 2,760 | 95.5 | −11 | .18 | 1.03 | 2.02 |
| Example 2 | 2,100 | 330 | 2,780 | 90 | −12 | .08 | 1.04 | 2.15 |
| Example 3 | 2,190 | 320 | 2,750 | 96 | −10 | .15 | .89 | 1.93 |
| Pentaerythritol Ester of C$_6$ Fatty Acids | 1,650 | (¹) | (¹) | (¹) | −26 | .56 | 2.4 | 5.6 |

¹ Not determined.

As can be seen from the data in the preceding table, the plasticizers of the invention are characterized by a balance of good properties and, in comparison to the pentaerythritol tetraester of $C_6$ fatty acids, have outstanding permanence characteristics as shown by the fact that they are much less extractable by oil or soap solution and have a much lower volatility.

As the examples have demonstrated, the plasticizers of the invention can be prepared by the esterification of pentaerythritol with the alkylene dicarboxylic acid and saturated fatty acid in proportions such that the esterified product comprises a novel chemical compound of Formula I. As obvious to persons skilled in the art, the plasticizers actually are mixtures of esters in which the ester of Formula I is present in a predominant amount. Naturally, since technical pentaerythritol is basically a mixture of pentaerythritol and dipentaerythritol, esters of dipentaerythritol are also present in the plasticizer, except when it is made from pure pentaerythritol. Also, various side reactions take place leading to the formation of, for example, minor amounts of the tetraester of pentaerythritol and the saturated fatty acid. Isolation of a pure ester of Formula I is impractical because of the closely related physical characteristics of the compounds present.

Various methods of making the plasticizers will be apparent to those skilled in the art because only well known esterification techniques are involved. It is often desirable, because of simplicity, to prepare the plasticizers simply by reacting the specified ingredients under esterification conditions, such as by heating from a temperature of from about 180 to 235° C. and allowing the water of reaction to evolve from the reaction mixture until esterification is essentially complete as evidenced by a low hydroxyl number. Normally, in the preparation of the plasticizers, an excess of saturated fatty acid is employed and after the esterification is complete, the excess saturated fatty acid is removed by fractional distillation. The order of addition of the reactions can, of course, be modified considerably and in one preferred modification only about one-half of the saturated fatty acid is added initially, the other half being added after a low acid number, preferably below 10, has been reached. For a reason as yet unexplained, this modification renders filtration of the final product easier.

The ingredients from which the plasticizer are made are fairly widely variable. The chain length of the alkylene dicarboxylic acid, for example, can vary from 4 to 10 carbon atoms without materially affecting the properties of the plasticizer. Representative dicarboxylic acids which can be used include succinic acid, glutaric acid, adipic acid, azelaic acid, and sebacic acid. The chain length of the saturated fatty acid is of somewhat greater significance because variations in chain length of this ingredient have been found to have a more pronounced effect on the properties of the plasticizers. To illustrate this, it has been found that if a single fatty acid is employed it must contain from 4 to 7 carbon atoms and if a mixture of fatty acids is employed the mixture must average from 4 to 7 carbon atoms but in the case of a mixture, the individual fatty acids may vary in chain length from about 3 to 10 carbon atoms. Saturated fatty acids which are useful include propionic acid, n-butyric acid, isobutyric acid, n-caproic acid, caprylic acid, pelargonic acid, and the like. The pentaerythritol can be either pure pentaerythritol or the technical pentaerythritol of commerce.

It is also understood that instead of employing alkylene dicarboxylic acids and saturated fatty acids in the preparation of the plasticizers, the lower alkyl esters of such acids can be employed as reactants and the plasticizer prepared by alcoholysis instead of esterification. The result is equivalent.

The plasticizers of the invention are useful modifiers for various vinyl resins such as polyvinyl chloride, polyvinyl acetate, mixed polymers of vinyl chloride with vinyl acetate or vinylidene chloride, and similar polymers. When used as plasticizers for such resins, the plasticizers are preferably employed in an amount ranging from about 5–100 parts per 100 parts of resin.

What I claim and desire to protect by Letters Patent is:

1. A composition useful as a plasticizer for synthetic resins comprising an ester having the formula:

(I) 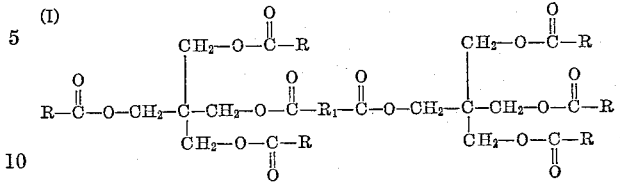

where $R_1$ is an alkylene radical of from 2 to 8 carbon atoms and each R represents an alkyl radical having from 2 to 9 carbon atoms with the average chain length of all R radicals being from 3 to 6 carbon atoms.

2. The composition of claim 1 in which $R_1$ is an ethylene radical.

3. The composition of claim 1 in which $R_1$ is a propylene radical.

4. The composition of claim 1 in which $R_1$ is a butylene radical.

5. The composition of claim 1 in which R contains an average of about 5 carbon atoms.

6. An ester having the formula:

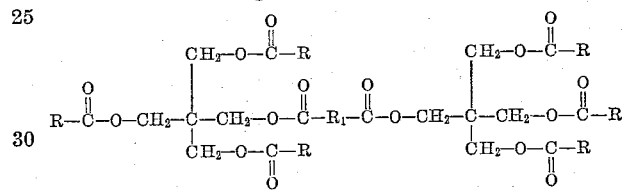

wherein $R_1$ is the hydrocarbyl residue of a dibasic acid selected from the group consisting of adipic and sebacic acids and wherein R is the hydrocarbyl residue of a monobasic acid selected from the group consisting of butyric and caproic acids.

7. An ester having the formula:

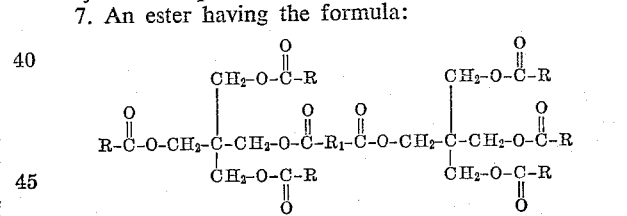

wherein $R_1$ represents an alkylene radical containing from 2 to 8 carbon atoms and wherein each R is the hydrocarbyl residue of a saturated aliphatic monocarboxylic acid containing from 4 to 9 carbon atoms and consisting of carbon, hydrogen and oxygen, with the average chain length of all R residues being from 3 to 6 carbon atoms.

References Cited in the file of this patent

UNITED STATES PATENTS

| | | |
|---|---|---|
| 2,588,194 | Arundale et al. | Mar. 4, 1952 |
| 2,611,756 | Pockel | Sept. 23, 1952 |

FOREIGN PATENTS

| | | |
|---|---|---|
| 663,566 | Great Britain | Dec. 27, 1951 |